United States Patent
Nakamura

(10) Patent No.: US 7,077,478 B2
(45) Date of Patent: Jul. 18, 2006

(54) SEAT FOR VEHICLE

(75) Inventor: Mitsumasa Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/136,130

(22) Filed: May 24, 2005

(65) Prior Publication Data

US 2005/0275273 A1 Dec. 15, 2005

(30) Foreign Application Priority Data

May 31, 2004 (JP) ............................ 2004-162155
May 31, 2004 (JP) ............................ 2004-162156

(51) Int. Cl.
*A47C 7/02* (2006.01)
*A47C 7/14* (2006.01)

(52) U.S. Cl. ........................... 297/452.18; 297/452.52; 297/452.56; 297/440.2; 297/440.22; 297/440.15

(58) Field of Classification Search ............. 297/440.2, 297/440.22, 452.11, 452.18, 452.19, 452.54, 297/452.55, 452.56, 452.49, 440.15, 452.52
See application file for complete search history.

(56) References Cited

U.S. PATENT DOCUMENTS 6,676,218 B1 * 1/2004 Fujita et al. ........... 297/452.49
6,817,673 B1 * 11/2004 Walker et al. ......... 297/452.19

2006/0055225 A1 * 3/2006 Yasuda et al. ......... 297/452.18

FOREIGN PATENT DOCUMENTS

JP 06014823 A * 1/1994
JP 2002-78561 3/2002

* cited by examiner

*Primary Examiner*—Anthony D Barfield
(74) *Attorney, Agent, or Firm*—Rankin, Hill, Porter & Clark LLP

(57) ABSTRACT

A first cushion receiving member of a seat cushion and a second cushion receiving member of a seat back are turnably connected to each other by a connecting member. The first cushion receiving member is turnably supported at its front end on a front frame of a first framework. The second cushion receiving member is supported on a second framework, through a spring fixed at its upper portion at at least two points and at its lower portion to the second framework and through an elastic fabric having a periphery fixed to the second framework. Thus, the first and second cushion receiving members can be prevented from being oscillated laterally, and the vibration caused by the expansion and contraction of the spring can be dampened by the elastic fabric. As a result, it is possible to permit the longitudinal and vertical movement of the first and second cushion receiving members for supporting the cushion members of the seat and to restrict the lateral movement of the cushion receiving members, and to thereby prevent uncomfortable lateral oscillation of an occupant's body so as to improve sitting comfort.

9 Claims, 10 Drawing Sheets

SEAT FOR VEHICLE

RELATED APPLICATION DATA

Japanese priority application Nos. 2004-162155 and 2004-162156, upon which the present application is based, are hereby incorporated in their entirety herein by reference.

BACKGROUND OF THE INVENTION

1. Field of the Invention

The present invention relates to a seat for a vehicle, comprising a seat cushion disposed generally horizontally for supporting an occupant's buttocks, and a seat back rising from a rear portion of the seat cushion for supporting the occupant's back, the seat cushion supporting a first cushion member on a first framework with a first cushion receiving member interposed therebetween, the seat back supporting a second cushion member on a second framework with a second cushion receiving member interposed therebetween.

2. Description of the Related Art

Such a seat for a vehicle is known, for example, from Japanese Patent Application Laid-open No. 2002-78561. This seat for the vehicle has a structure in which a first cushion receiving member for supporting a first cushion member against that an occupant's buttocks abut, is supported in a floating manner inside a frame-shaped first framework with a resilient member such as a spring interposed therebetween; a second cushion receiving member for supporting a second cushion member against that the occupant's back abuts, is supported in a floating manner inside a second framework with a resilient member such as a spring interposed therebetween; and further, a rear end of the first cushion receiving member and a lower end of the second cushion receiving member are connected to each other by a deformable connecting member.

The seat described in Japanese Patent Application Laid-open No. 2002-78561 suffers from a problem that a body of an occupant sitting on the seat may be oscillated laterally and, hence, the attitude of the occupant is not stabilized, resulting in a poor sitting comfort, because the first cushion receiving member on the side of a seat cushion and the second cushion receiving member on the side of a seat back are supported in the floating manner in the first and second frameworks with the resilient members or springs interposed therebetween.

SUMMARY OF THE INVENTION

The present invention is directed toward a seat for a vehicle that prevents or minimizes uncomfortable lateral oscillation of an occupant's body. The present invention is further directed toward a vehicle seat that improves sitting comfort of the occupant by permitting longitudinal and vertical movement of a cushion receiving member for supporting the cushion member of the seat and restricting lateral movement of the cushion receiving member.

In accordance with a first feature of the invention, there is provided a seat for a vehicle, comprising: a seat cushion disposed generally horizontally for supporting an occupant's buttocks; and a seat back rising from a rear portion of the seat cushion for supporting the occupant's back, the seat cushion supporting a first cushion member on a first framework with a first cushion receiving member interposed therebetween, the seat back supporting a second cushion member on a second framework with a second cushion receiving member interposed therebetween, wherein a front end of the first cushion receiving member is turnably supported at a front end of the first framework; a lower end of the second cushion receiving member is turnably connected to a rear end of the first cushion receiving member; and the second cushion member is supported on the second framework through a spring, the spring having upper and lower portions and wherein the spring upper portion is fixed to the second framework at at least two points, and wherein the spring lower portion is fixed to the second framework.

With the above arrangement, the first cushion receiving member of the seat cushion and the second cushion receiving member of the seat back are turnably connected to each other; the first cushion receiving member is turnably supported at its front end at the front end of the first framework; and the second cushion receiving member is supported on the second framework through the spring, which is fixed at its upper portion at at least two points to the second framework and is also fixed at its lower portion to the second framework. Therefore, the first and second cushion receiving members can be moved vertically and longitudinally, while being prevented from being oscillated laterally, leading to an improvement in feeling of stability of sitting comfort.

In accordance with a second feature of the present invention, the second cushion receiving member is supported on the second framework through the spring and an elastic fabric having a periphery fixed to the second framework.

With the above arrangement, vibration caused by the expansion and contraction of the spring is dampened by the elastic fabric, and thereby decreases fatigue experienced by the occupant.

In accordance with a third feature of the present invention at least a portion of the first framework is formed by coupling pipe materials to each other, and at least a portion of an operating cable connecting a manipulating member mounted on the first framework to a seat-mounting device is accommodated in the pipe materials.

With the above arrangement, at least a portion of the first framework of the seat cushion is formed by coupling the pipe materials, and at least a portion of an operating cable connecting the manipulating member mounted on the first framework to the seat-mounting device is accommodated in the pipe materials. Therefore, the cable can be hidden invisibly to improve aesthetic appearance, and can be prevented from being damaged by contact with other members.

In accordance with a fourth feature of the present invention, the pipe materials of the first framework are coupled at a blunt angle and thereby define a coupled portion, and the operating cable is reeved around the coupled portion.

With the above arrangement, the operating cable is reeved around the coupled portion of the pipe materials of the first framework coupled at the blunt angle. Therefore, steep or sharp bending of the operating cable is avoided, and the seat-mounting device can be smoothly operated.

In accordance with a fifth feature of the present invention, the first cushion receiving member is supported at its front end on the pipe material extending laterally at a front portion of the first framework, and the manipulating member of the operating cable connected to the seat-mounting device is disposed at an end of the pipe material.

With the above arrangement, the manipulating member is disposed at the end of the laterally-extending pipe material at the front portion of the first framework to support the front end of the first cushion receiving member. Therefore, the occupant sitting on the seat can easily manipulate the manipulating member.

In further accordance with the present invention, a front leg and a front frame correspond to the aforementioned pipe materials; each of first and second locking mechanisms corresponds to the aforementioned seat-mounting device; first and second knobs correspond to the aforementioned manipulating device; and, first and second Bowden wires correspond to the aforementioned operating cable.

The above and other objects, features and advantages of the invention will become apparent from the following description of the preferred embodiment taken in conjunction with the accompanying drawings.

DETAILED DESCRIPTION OF PREFERRED EMBODIMENT

Figure 1:
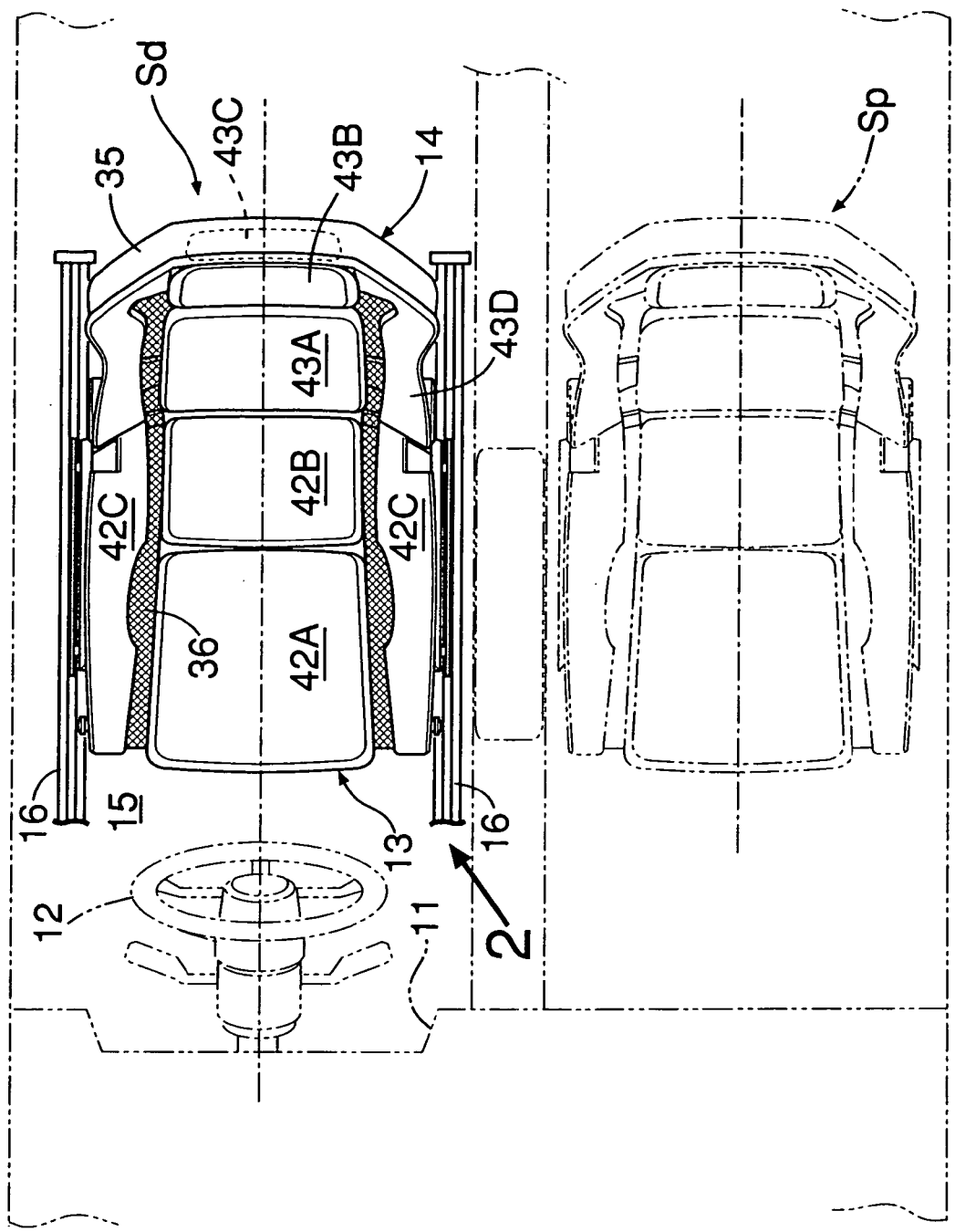
FIG. 1 is a plan view of a front seat of an automobile, according to an embodiment of the present invention.
Figure 2:
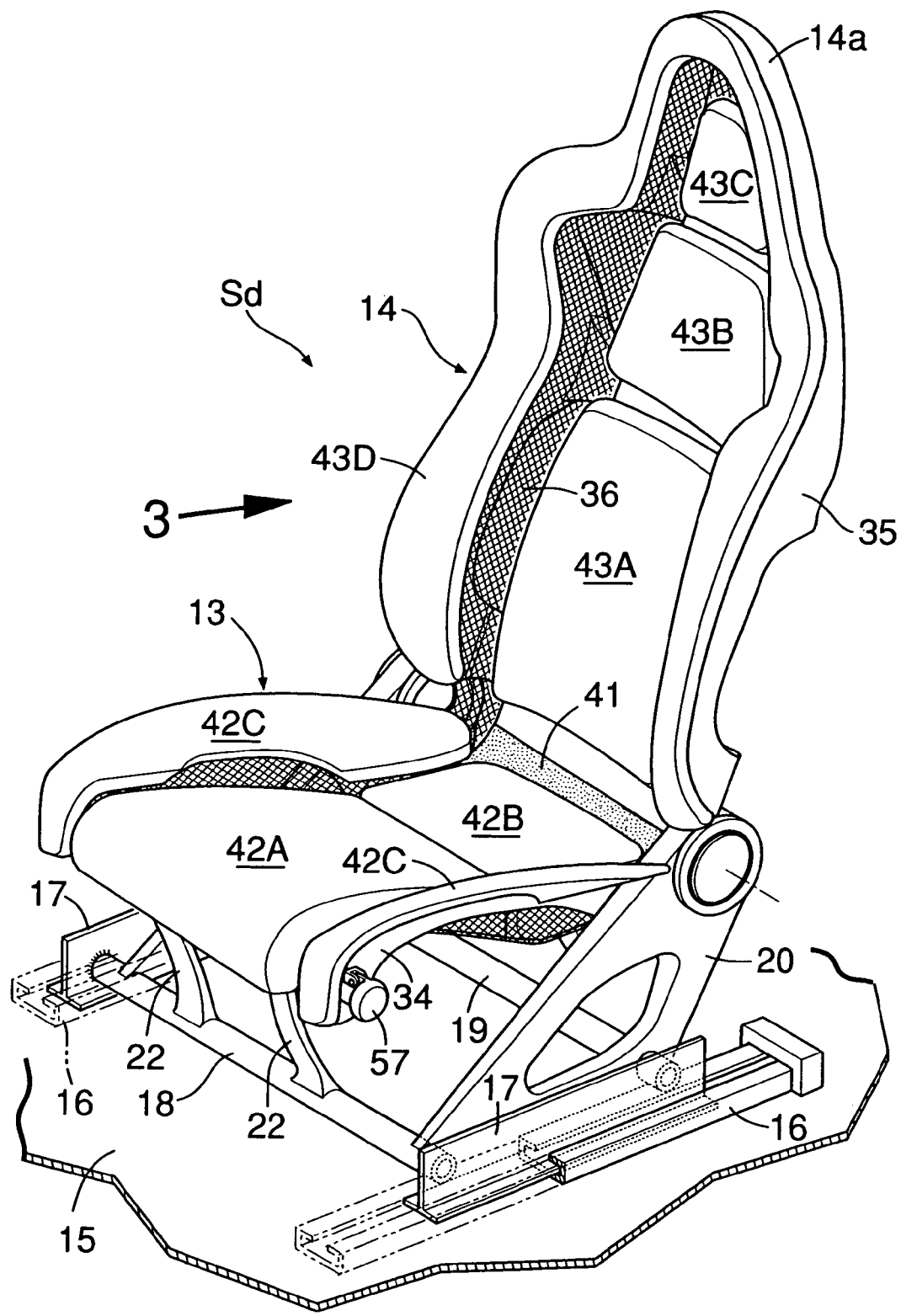
FIG. 2 is a perspective view of the front seat according to the present invention, as seen from the direction of arrow 2 in FIG. 1.
Figure 3:
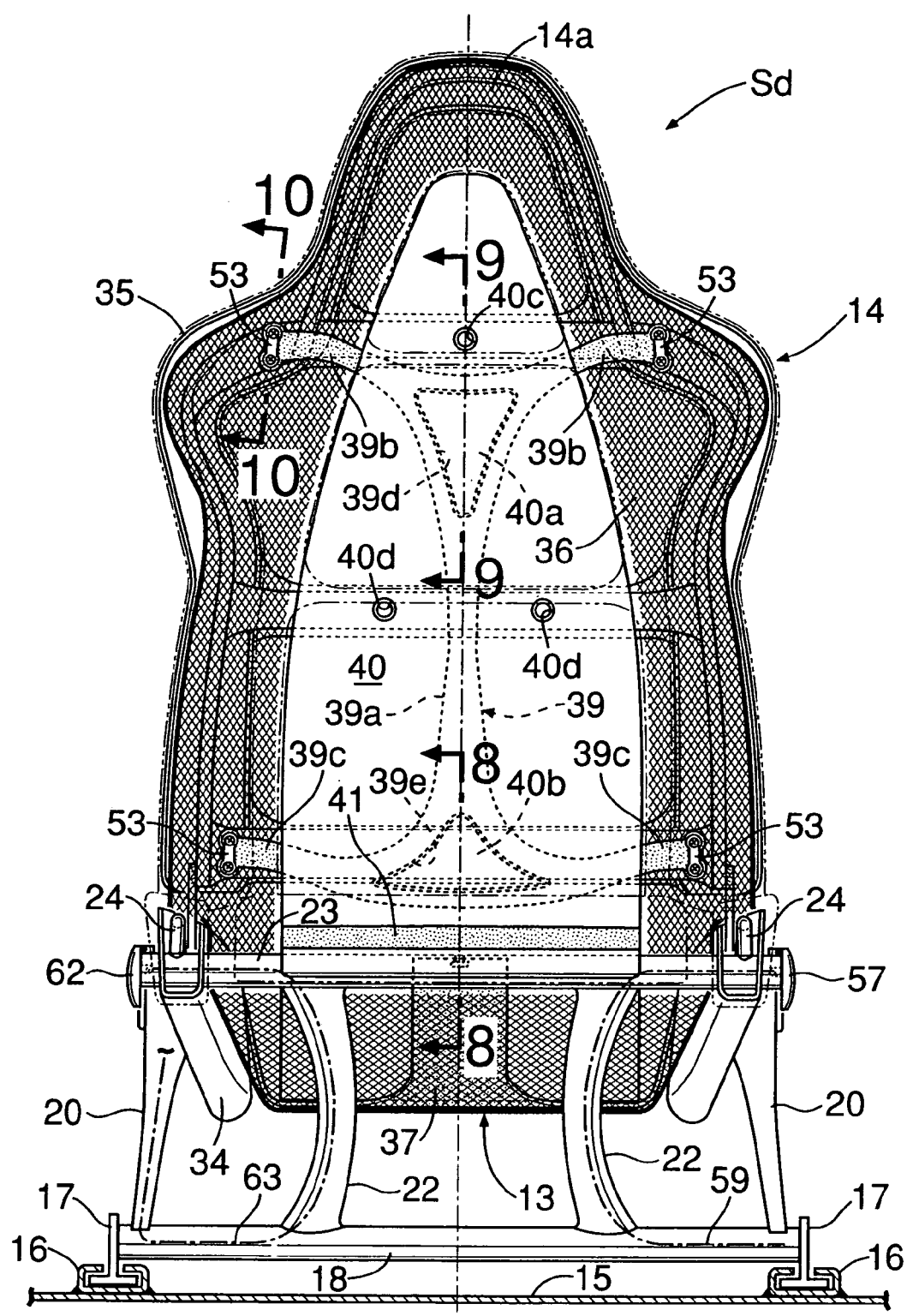
FIG. 3 is a front elevational view of the front seat according to the present invention, as seen from the direction of arrow 3 in FIG. 2, and in which a cushion member has been removed for purposes of clarity.

The present invention will now be described by way of an embodiment with reference to the accompanying drawings.

As shown in FIGS. 1 to 5, a front seat arrangement for an automobile comprises: a driver's seat Sd located behind a steering wheel 12 mounted on the right of a dashboard 11; and a passenger's seat Sp juxtaposed on the left of the driver's seat Sd. The driver's seat Sd includes: a seat cushion 13 disposed generally horizontally to support a driver's buttocks and a seat back 14 which recliningly rises from a rear end of the seat cushion 13. A head rest 14a is integrally formed at an upper end of the seat back 14. Left and right sliders 17, 17 are slidably fitted to left and right guide rails 16, 16 extending longitudinally on a floor panel 15. The left and right sliders 17, 17 are connected to each other by a front connecting member 18 and a rear connecting member 19. Each of the connecting members 18, 19 is made from a pipe material. A pair of left and right base members 20, 20 are integrally fixed to the front connecting member 18 and the rear connecting member 19.

A first framework 21 constituting a framework of the seat cushion 13 comprises: left and right front legs 22, 22 rising from the front connecting member 18; a front frame 23 extending laterally to connect upper ends of the front legs 22, 22 to each other; left and right side frames 24, 24 extending rearwardly from left and right opposite ends of the front frame 23; left and right brackets 25, 25 connected to rear ends of the side frames 24, 24 and supported at upper ends of the base members 20, 20; and a rear frame 26 extending laterally to connect the left and right brackets 25, 25 to each other.

A second framework 27 constituting a framework of the seat back 14 comprises: left and right brackets 28, 28 pivotally supported on the left and right brackets 25, 25 of the first framework 21 for swinging movement in a longitudinal direction; left and right side frames 29, 29 rising from the left and right brackets 28, 28; a lower frame 30, a central frame 31 and an upper frame 32 extending laterally to connect lower portions, intermediate portions and upper portions, respectively, of the left and right side frames 29, 29; and a head rest frame 33 connecting opposite ends of the upper frame 32 to each other.

Left and right opposite sides and a rear surface of the first framework 21 are covered with a first shell cover 34 integrally molded from a synthetic resin. A rear surface of the second framework 27 is covered with a second shell cover 35 integrally molded from a synthetic resin.

An upper surface of the first framework 21 and a front surface of the second framework 27 are covered with an elastic fabric 36 formed from a stretch able net or net-like material. A first cushion receiving member 38 made of a synthetic resin is superposed on an upper surface of the elastic fabric 36 covering the upper surface of the first framework 21 with a first spring 37, which is made from an elastic or rubber-like material, interposed therebetween. A second cushion receiving member 40 made of a synthetic resin is superposed on a front surface of the elastic fabric 36 covering the front surface of the second framework 27 with a second spring 39, which is made from an elastic or rubber-like material, interposed therebetween. A rear end of the first cushion receiving member 38 and a lower end of the second cushion receiving member 40 are turnably connected to each other through a connecting member 41, which is preferably made from an elastic or rubber-like material.

Four separate first cushion members 42A, 42B, 42C and 42C for supporting the driver's buttocks are bonded to an upper surface of the first cushion receiving member 38. Four separate second cushion members 43A, 43B, 43C and 43D for supporting the driver's back and head are bonded to a front surface of the second cushion receiving member 40.

Figure 8:
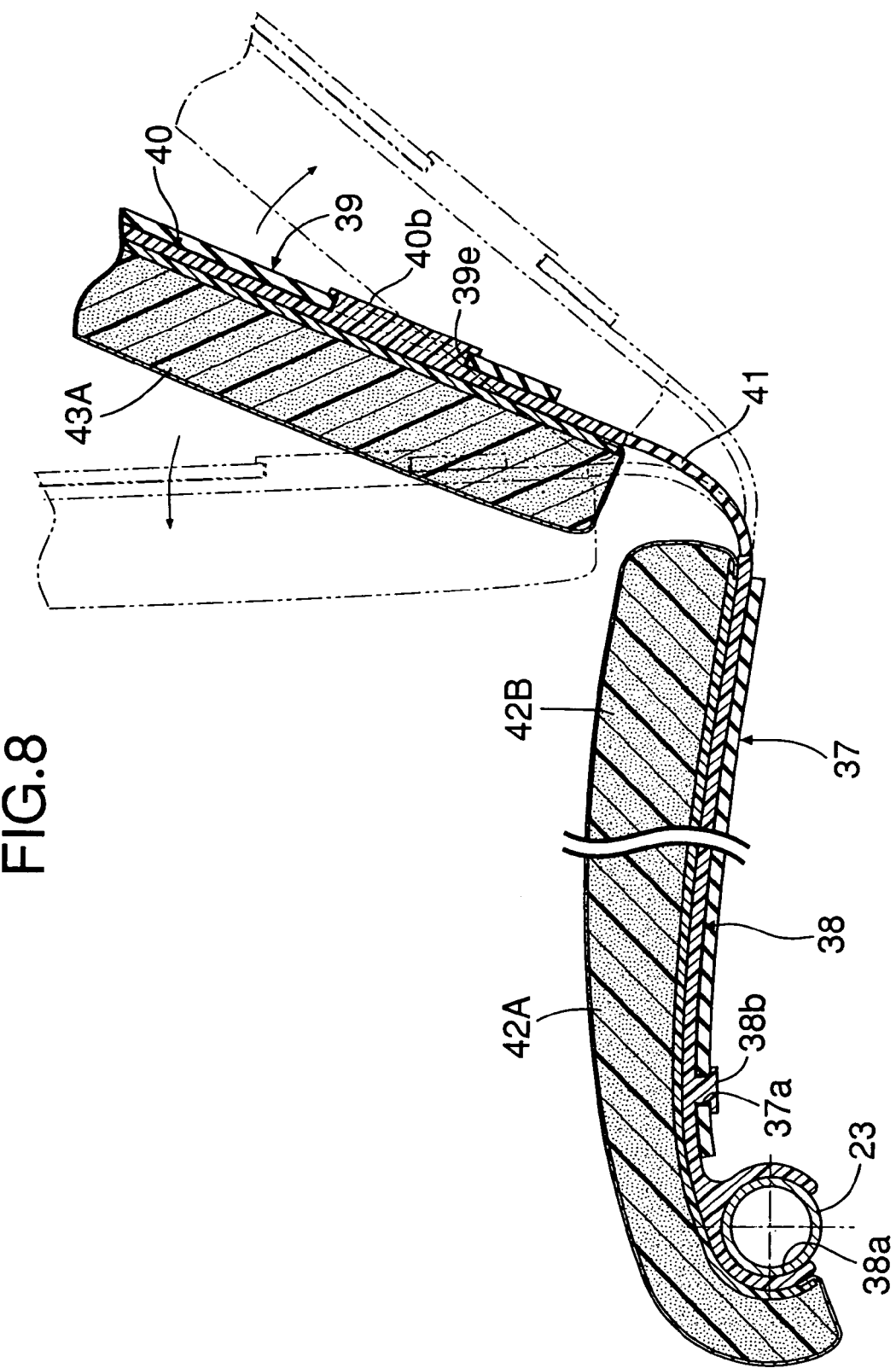
FIG. 8 is an enlarged cross-sectional view of the vehicle seat as seen along line 8—8 in FIG. 3.
Figure 9:
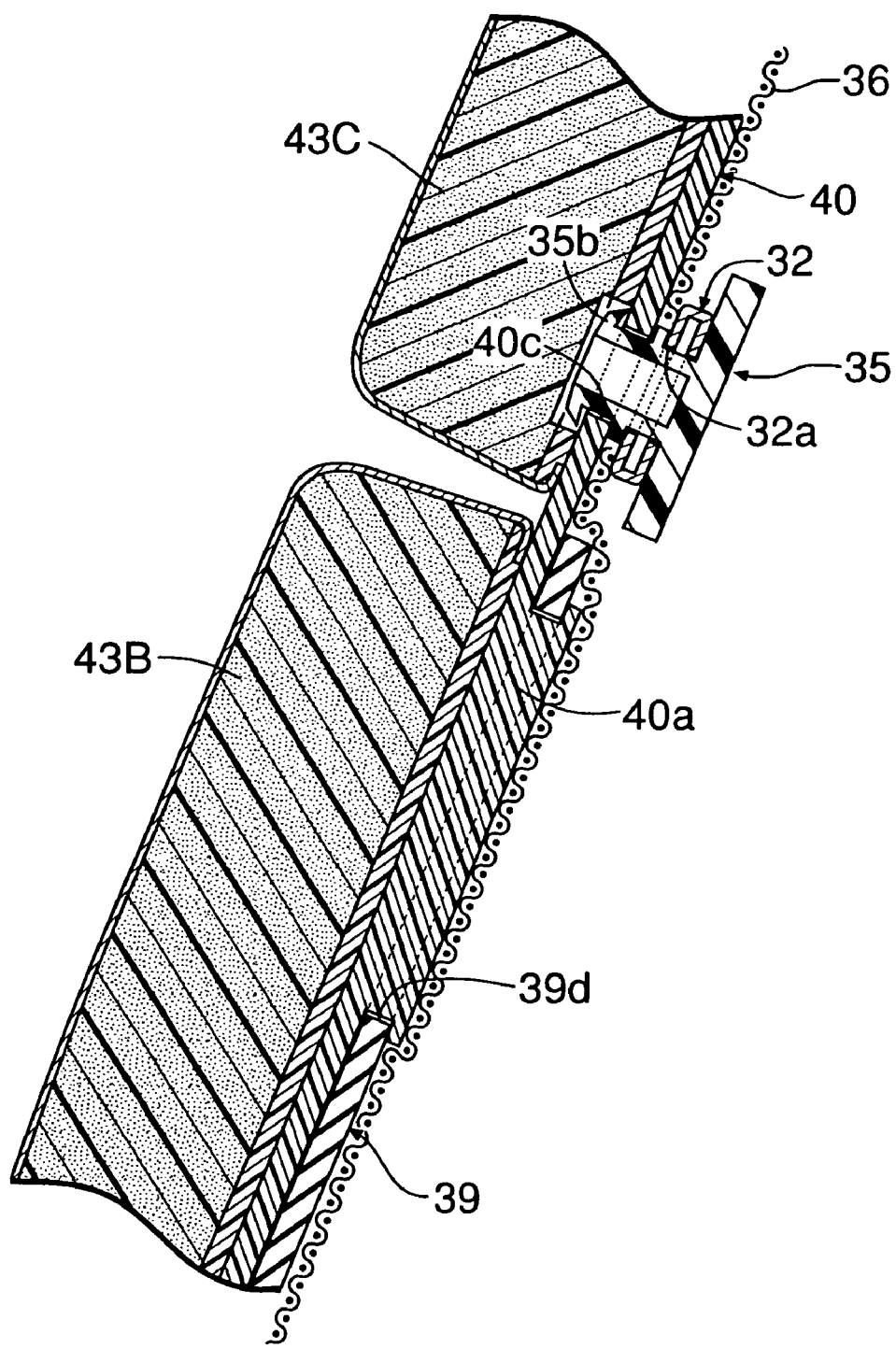
FIG. 9 is an enlarged cross-sectional view of the vehicle seat as seen along line 9—9 in FIG. 3.
Figure 10:
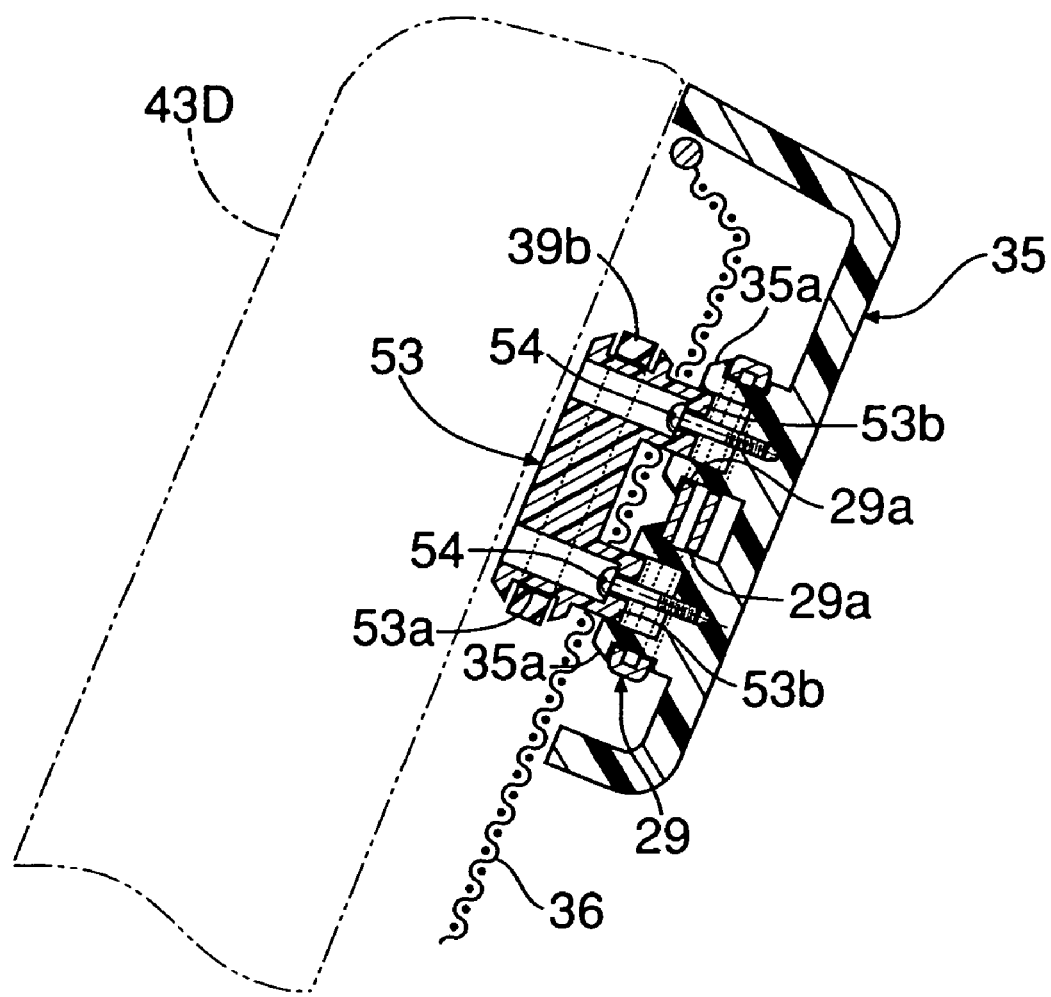
FIG. 10 is an enlarged cross-sectional view of the vehicle seat as seen along line 10—10 in FIG. 3.

As shown in FIG. 8, a front end of the first cushion receiving member 38 includes a connecting portion 38a having a circular section with a portion of its lower surface being opened. The front end of the first cushion receiving member 38 is fixed to a front end of the first framework 21, by fitting the connecting portion 38a over the front frame 23 of the first framework 21 from above. Preferably, the connecting portion 38a snaps over and around the tubular front frame 23 so as to secure the first cushion receiving member to the front framework 21.

Figure 4:
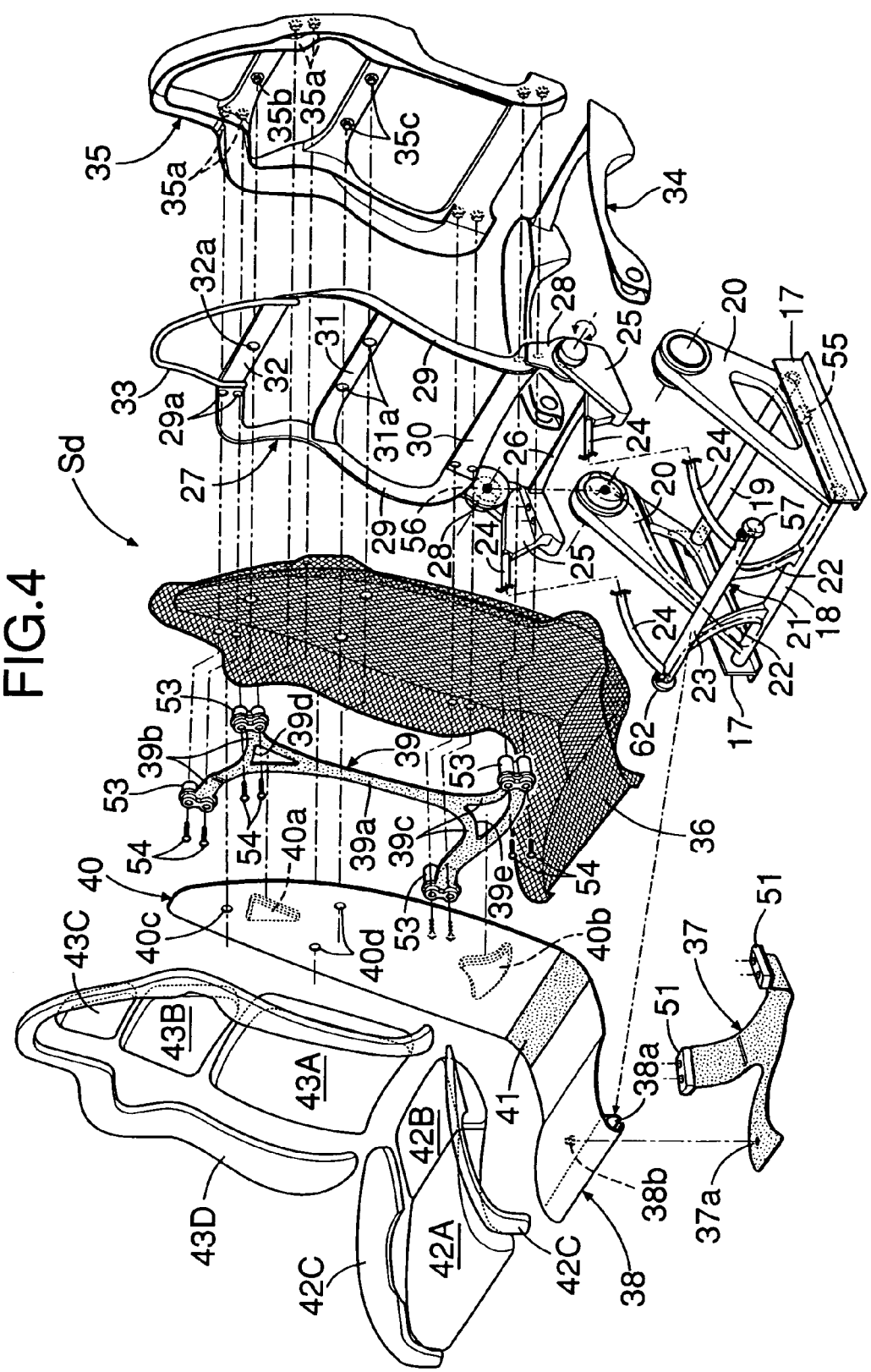
FIG. 4 is an exploded perspective view of a driver's seat according to the present invention.
Figure 5:
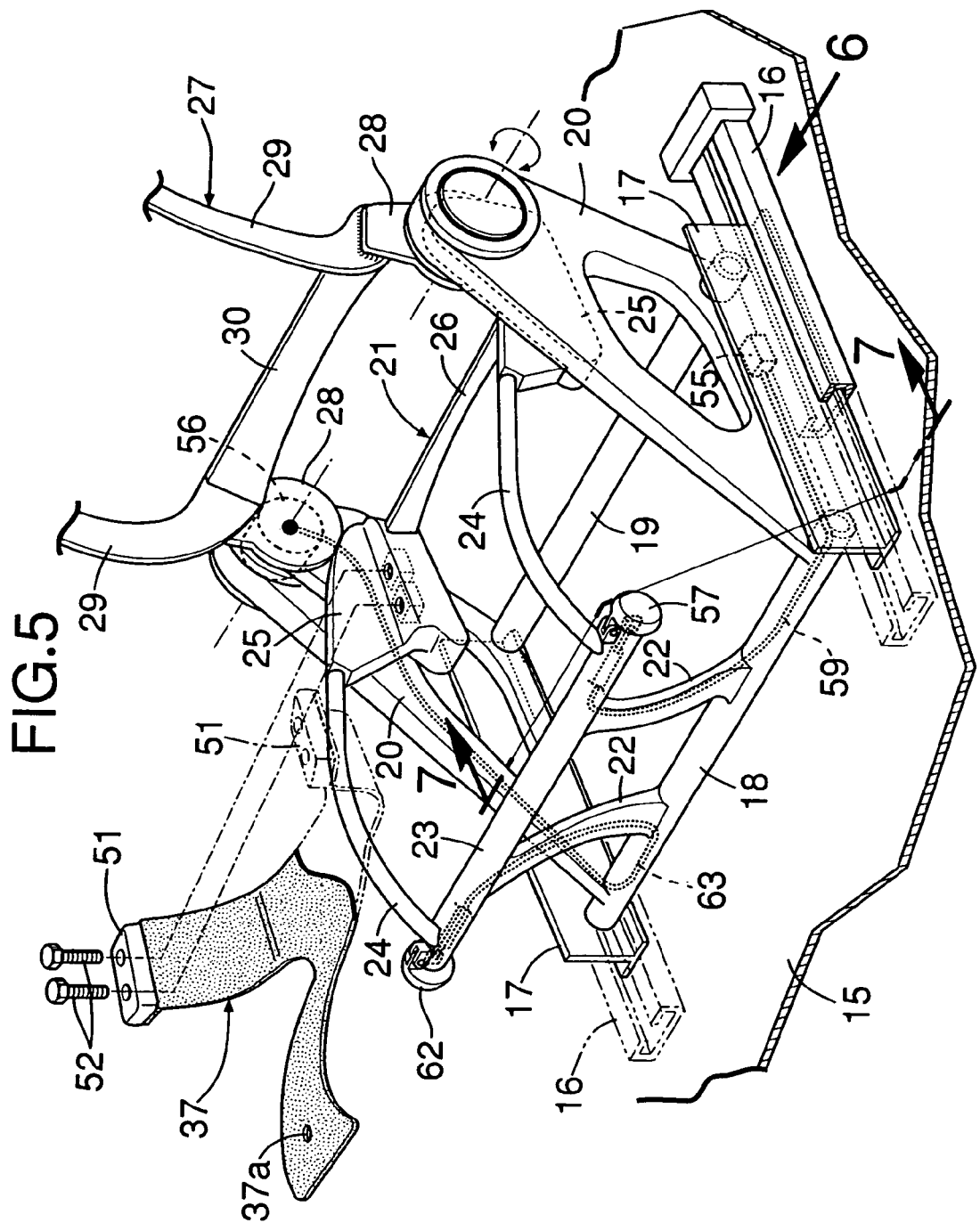
FIG. 5 is an enlarged perspective view of portions of the seat frame FIG. 4 in an assembled condition.
Figure 6:
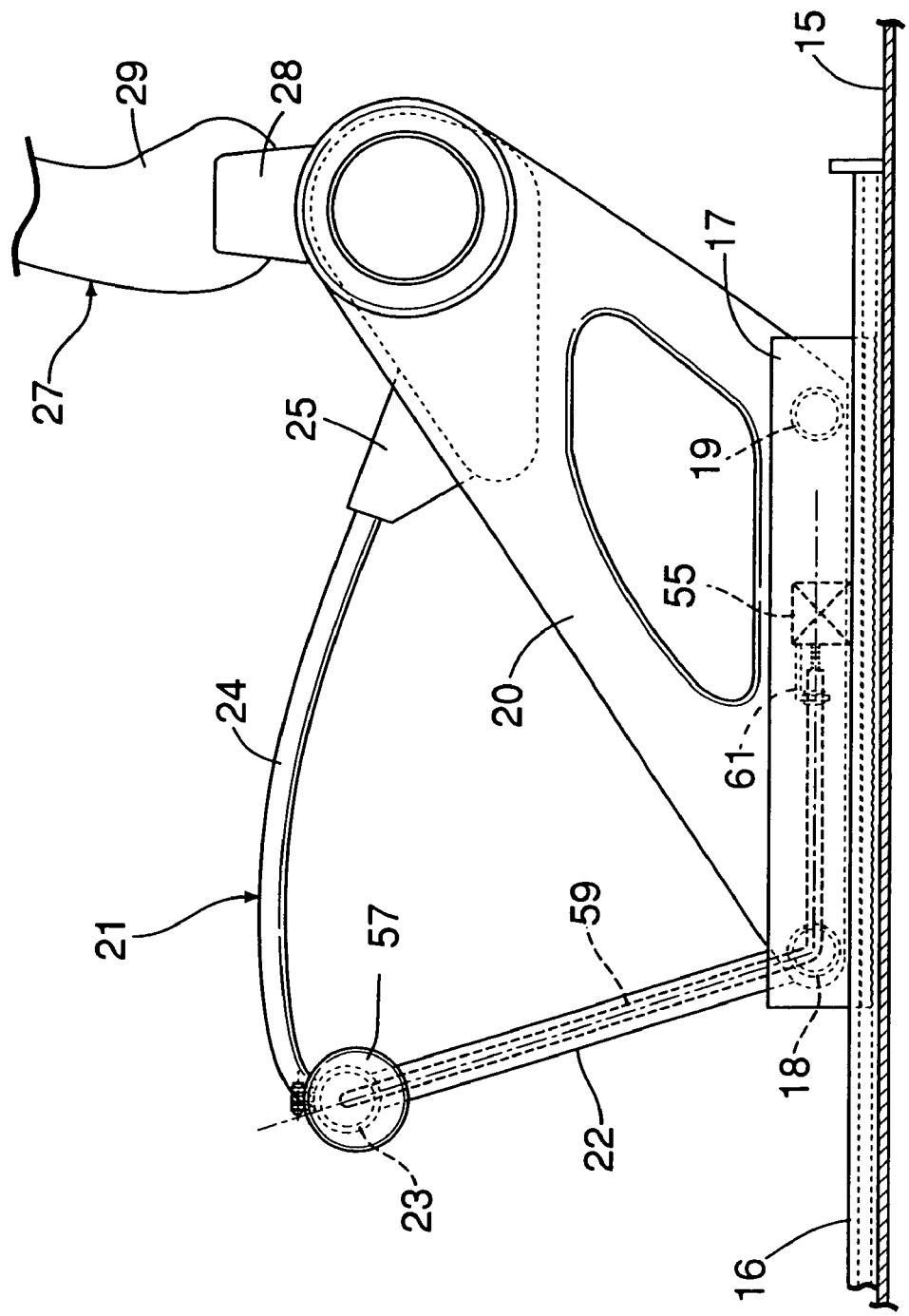
FIG. 6 is a side elevational view of the seat frame portions as seen from the direction of arrow 6 in FIG. 5.
Figure 7:
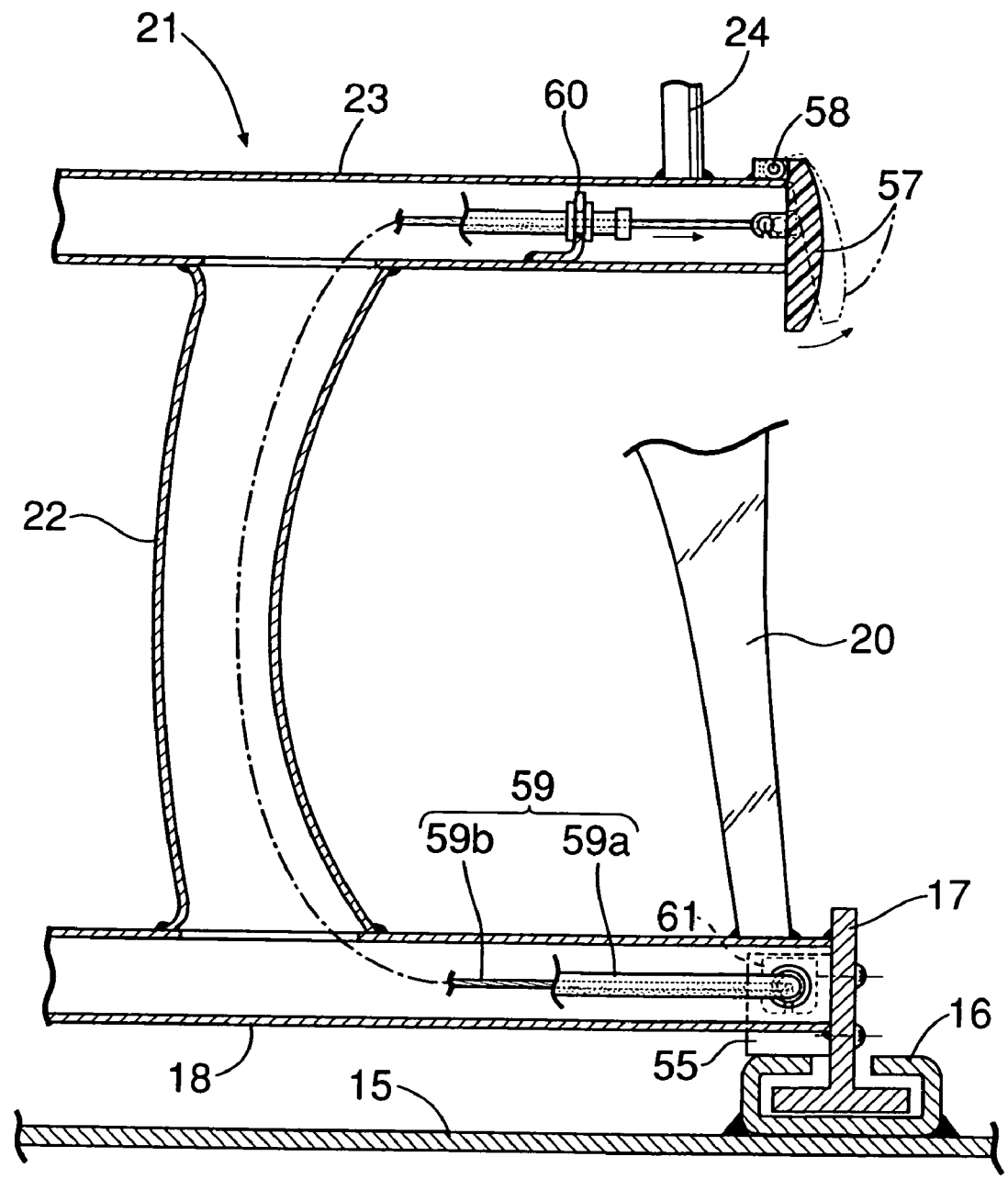
FIG. 7 is a cross-sectional view of the vehicle seat as seen along line 7—7 in FIG. 5.

As shown in FIGS. 4, 5 and 8, the first spring 37 is formed from a rubber plate cut into a T-shape, when viewed from above, and having a bowl-like shape such that a central portion is recessed relative to outer portions, as illustrated. Fixing members 51, 51 are mounted to tip ends of laterally extending bifurcated portions of the first spring 37, and then fixed to the left and right brackets 25, 25 of the first framework 21 by two bolts 52, 52, respectively. A mounting bore 37a formed in the tip end of a forward extending portion of the first spring 37 is engaged with and fixed to a flanged projection 38b provided on the lower surface of the first cushion receiving member 38.

Thus, the weight of a driver sitting on the driver's seat Sd is supported on the front frame 23 and the left and right brackets 25, 25 of the first framework 21, through the first cushion members 42A to 42C of the seat cushion 13, the first cushion receiving member 38 and the first spring 37, leading to an improvement in sitting comfort due to the expansion and contraction of the first spring 37.

As shown in FIGS. 3, 4 and 8 to 10, the second spring 39, which is preferably formed from a rubber plate, includes: a body 39a extending vertically; a pair of upper branches 39b, 39b extending laterally from an upper end of the body 39a; and a pair of lower branches 39c, 39c extending laterally from a lower end of the body 39a. Triangular openings 39d and 39e are formed in roots of the upper branches 39b, 39b and in roots of the lower branches 39c, 39c, respectively.

A fixing member 53, which is preferably made of a synthetic resin, includes a groove 53a formed around its outer periphery, and two protrusions 53b, 53b projecting from one end face. A tip end of the upper branch 39b of the second spring 39 is fitted into and locked in the groove 53a of the fixing member 53. The protrusions 53b, 53b of the fixing member 53 are passed through the net-shaped elastic fabric 36. On the other hand, two locking claws 35a, 35a integrally projecting from a front surface of the second shell cover 35 are locked in two locking bores 29a, 29a formed in the second framework side frame 29, which is made of a flat pipe material, laterally outboard of the upper frame 32. In this state, two bolts 54, 54 passed through the protrusions 53b, 53b of the fixing member 53 are passed through centers of the locking claws 35a, 35a and the locking bores 29a, 29a, and threadedly engaged with the second shell cover 35. With this structure, the second shell cover 35, the second framework 27, the elastic fabric 36, and the pair of upper branches 39b, 39b of the second spring 39 are integrally coupled to one another.

The pair of lower branches 39c, 39c of the second spring 39 are also fixed by a structure similar to that in the case of the above-described pair of upper branches 39b, 39b.

Generally triangular flanged locking projections 40a and 40b integrally project from the rear surface of the second cushion receiving member 40. The upper opening 39d in the second spring 39 is fitted over the upper locking projection 40a, and the lower opening 39e in the second spring 39 is fitted over the lower locking projection 40b, whereby the second spring 39 is fixed to the second cushion receiving member 40.

A locking claw 35b integrally projecting from the front surface of the second shell cover 35 is passed through a locking bore 32a formed in the second framework upper frame 32, which is made of a flat pipe material, and through the elastic fabric 36. The locking claw 35b is engaged into a locking bore 40c formed in the second cushion receiving member 40. Likewise, locking claws 35c, 35c integrally projecting from the front surface of the second shell cover 35 are passed through associated locking bores 31a, 31a formed in the second framework central frame 31, which is made of a flat pipe material, and through the elastic fabric 36. The locking claws 35c, 35c are engaged into locking bores 40d, 40d formed in the second cushion receiving member 40. With this structure, the second shell cover 35, the second framework 27, the elastic fabric 36, and the second cushion receiving member 40 are integrally coupled to one another.

As described above, the first cushion receiving member 38 on the side of the seat cushion 13 and the second cushion receiving member 40 on the side of the seat back 14 are turnably connected to each other by the connecting member 41 having a flexibility; the front end of the first cushion receiving member 38 is turnably supported on the front frame 23 of the first framework 21; and the second cushion receiving member 40 is supported on the second framework 27 through the second spring 39 and the elastic material. More specifically, an upper portion of the second spring 39 is fixed at at least two points to the second framework 27 and a lower portion of the second spring is fixed to the second framework 27. The elastic fabric 36 is fixed at spaced apart locations along its periphery to the second framework 27. Therefore, the first and second cushion receiving members 38 and 40 can be moved vertically and longitudinally, while being prevented from oscillating laterally, leading to an improvement in feeling of stability of sitting comfort. Further, vibration caused by the expansion and contraction of the first and second springs 37 and 39 can be dampened quickly by the elastic fabric 36, leading to a decrease in fatigue of an occupant.

As shown best in FIGS. 4 to 7, a first locking mechanism 55 is mounted on the left guide rail 16 to lock and unlock the left slider 17 in order to selectively retain the driver's seat Sd in a predetermined longitudinal position and to permit movement of the driver's seat Sd to a different longitudinal position. A second locking mechanism 56 is mounted on the right bracket 25 of the first framework 21 to lock and unlock the right bracket 28 of the second framework 27, in order to adjust the reclining angle of the seat back 14 with respect to the seat cushion 13.

A first knob 57 is pivotally supported at a left end of the front frame 23 of the first framework 21 through a pivot pin 58, and the first knob 57 and the first locking mechanism 55 are connected to each other through a first Bowden wire 59. The Bowden wire 59 comprises a stationary outer tube 59a and a slidable inner cable 59b. The outer tube 59a is supported at one end on a stay 60 mounted within the front frame 23 and at the other end on a stay 61 mounted on the locking mechanism 55, so that manipulation of the first knob 57 is transmitted to the first locking mechanism 55 by the inner cable 59b slid within the outer tube 59a.

The major portion of the first Bowden wire 59 excluding a portion on the side of the first locking mechanism 55 is disposed within the front frame 23, the left front leg 22 and the front connecting member 18, all of which are formed of a pipe material. Therefore, the first Bowden wire 59 is hidden invisibly from the outside to improve aesthetic appearance, and can be prevented from being damaged by the interference with the other members.

A second knob 62 is pivotally supported at a right end of the front frame 23 of the first framework 21 through a pivot pin (not shown), and the second knob 62 and the second locking mechanism 56 are connected to each other through a second Bowden wire 63. The second Bowden wire 63 comprises a stationary outer tube and a slidable inner cable. The outer tube is supported at one end on a stay (not shown) mounted within the front frame 23 and at the other end on a stay (not shown) mounted on the second locking mechanism 56, and manipulation of the second knob 62 is transmitted to the second locking mechanism 56 by the inner cable slid within the outer tube.

The major portion of the second Bowden wire 63 excluding a portion on the side of the second locking mechanism 56 is disposed within the front frame 23, the right front leg 22, the front connecting member 18 and the right base member 20, all of which are formed of a pipe material or a hollow material. Therefore, the second Bowden wire 63 is hidden invisibly from the outside, leading to an improvement in aesthetic appearance, and can be prevented from being damaged by interference with other members.

Especially, the front legs 22, 22 of the first framework 21 are slightly curved into an arcuate shape and coupled at a blunt angle to the front connecting member 18 and the front frame 23. Therefore, the first and second Bowden wires 59 and 63 accommodated in these members can be prevented from being sharply bent at connections between the front legs 22, 22 and the front connecting member 18 and at connections between the front legs 22, 22 and the front frame 23, so that the first and second locking mechanisms 55 and 56 can be smoothly operated. Moreover, since the first and second knobs 57 and 62 are disposed at left and right opposite ends of the front frame 23 on which the front end of the first cushion receiving member 38 of the seat cushion 13 is supported, an occupant sitting on the driver's seat Sd can easily manipulate the first and second knobs 57 and 62 without changing their attitude, leading to a remarkable improvement in manipulatability.

Although the embodiment of the present invention has been described in detail, it will be understood that various modifications in design may be made without departing from the subject matter of the invention.

For example, the driver's seat Sd has been described in the embodiment, but the present invention is also applicable to a passenger's seat Sp or a rear seat.

In addition, the second spring 39 in the embodiment includes the upper branches 39b, 39b and the lower branches 39c, 39c, but the lower branches 39c, 39c are not necessarily required, and a satisfactory effect can be expected with only the upper branches 39b, 39b.

Further, the elastic fabric 36 is not necessarily limited to a net-like material. Rather, any stretchable elastic fabric 36 may be used.

What is claimed is:

1. A seat for a vehicle, comprising:
   a seat cushion disposed generally horizontally for supporting an occupant's buttocks; and,
   a seat back rising from a rear portion of the seat cushion for supporting an occupant's back, the seat cushion supporting a first cushion member on a first framework with a first cushion receiving member interposed therebetween, the seat back supporting a second cushion member on a second framework with a second cushion receiving member interposed therebetween,
   wherein the first cushion receiving member has a front end that is turnably supported at a front end of the first framework;
   the second cushion receiving member has a lower end that is turnably connected to a rear end of the first cushion receiving member; and,
   the second cushion member is supported on the second framework through a spring having an upper portion and a lower portion, said spring upper portion being fixed at at least two points to the second framework, and said spring lower portion being fixed to the second framework.

2. The vehicle seat according to claim 1, wherein the second cushion receiving member is supported on the second framework through the spring and an elastic fabric, said elastic fabric being fixed along a periphery thereof to the second framework.

3. The vehicle seat according to claim 1, wherein at least a portion of the first framework is formed by coupling pipe materials to each other, and at least a portion of an operating cable connecting a manipulating member mounted on the first framework to a seat-mounting device is accommodated in the pipe materials.

4. The vehicle seat according to claim 3, wherein the pipe materials of the first framework are coupled at a blunt angle to define a coupled portion, and the operating cable is reeved around said coupled portion.

5. The vehicle seat according to claim 3, wherein the front end of the first cushion receiving member is supported on the pipe material extending laterally at a front portion of the first framework, and the manipulating member of the operating cable connected to the seat-mounting device is disposed at an end of the laterally extending pipe material.

6. The vehicle seat according to claim 2, wherein the spring, elastic fabric, and second framework are integrally coupled to one another.

7. The vehicle seat according to claim 6, wherein at least a portion of the first framework is formed by coupling pipe materials to each other, and at least a portion of an operating cable connecting a manipulating member mounted on the first framework to a seat-mounting device is accommodated in the pipe materials.

8. The vehicle seat according to claim 7, wherein the pipe materials of the first framework are coupled at a blunt angle to define a coupled portion, and the operating cable is reeved around said coupled portion.

9. The vehicle seat according to claim 7, wherein the front end of the first cushion receiving member is supported on the pipe material extending laterally at a front portion of the first framework, and the manipulating member of the operating cable connected to the seat-mounting device is disposed at an end of the laterally extending pipe material.

* * * * *